United States Patent
Barel et al.

(10) Patent No.: US 12,534,120 B2
(45) Date of Patent: Jan. 27, 2026

(54) DEVICE AND SYSTEM FOR RETRACTING A CONTROL CONSOLE OF A VEHICLE IN AN EMERGENCY

(71) Applicant: REE AUTOMOTIVE LTD, Glil-Yam (IL)

(72) Inventors: Daniel Barel, Herzliya (IL); Ido Gury, Tel-Aviv Jaffa (IL)

(73) Assignee: REE AUTOMOTIVE LTD, Kibbutz Glil-Yam (IL)

( * ) Notice: Subject to any disclaimer, the term of this patent is extended or adjusted under 35 U.S.C. 154(b) by 0 days.

(21) Appl. No.: 18/823,809

(22) Filed: Sep. 4, 2024

(65) Prior Publication Data
US 2025/0083733 A1 Mar. 13, 2025

Related U.S. Application Data

(60) Provisional application No. 63/581,129, filed on Sep. 7, 2023.

(51) Int. Cl.
*B62D 1/183* (2006.01)
*B62D 1/184* (2006.01)

(52) U.S. Cl.
CPC ............. *B62D 1/183* (2013.01); *B62D 1/184* (2013.01)

(58) Field of Classification Search
CPC .......... B62D 1/183; B62D 1/197; B62D 1/19; B62D 1/192; B62D 1/189
See application file for complete search history.

(56) References Cited

U.S. PATENT DOCUMENTS

| 8,899,623 | B2* | 12/2014 | Stadler | B62D 5/001 280/775 |
| 9,764,756 | B2* | 9/2017 | Sugioka | B62D 1/181 |
| 10,207,697 | B2* | 2/2019 | Brown | B60R 21/09 |
| 10,577,009 | B2* | 3/2020 | Lubischer | B62D 1/183 |
| 11,858,444 | B2* | 1/2024 | Yamazaki | B60R 21/205 |
| 12,091,077 | B2* | 9/2024 | Kobayashi | B60R 21/09 |
| 2007/0029771 | A1* | 2/2007 | Haglund | B62D 1/181 280/775 |
| 2009/0085338 | A1* | 4/2009 | Tanaka | B60K 37/00 280/752 |

FOREIGN PATENT DOCUMENTS

| DE | 10 2018 007 080 | 3/2019 |
| JP | 2007276582 | 10/2007 |
| JP | 2007276716 | 10/2007 |
| WO | WO 2021215911 | 10/2021 |

* cited by examiner

Primary Examiner — Paul N Dickson
Assistant Examiner — Tiffany L Webb
(74) Attorney, Agent, or Firm — PEARL COHEN ZEDEK LATZER BARATZ LLP

(57) ABSTRACT

A retractable console system for a vehicle, which may include: a control console; a linkage coupled to the control console; an actuator coupled to the linkage, the actuator may: lock the linkage and the control console coupled thereto in an operational position; and upon detection of an emergency, abruptly unlock and cause the linkage and the console coupled thereto to move from the operational position to a non-operational emergency position by releasing energy.

19 Claims, 8 Drawing Sheets

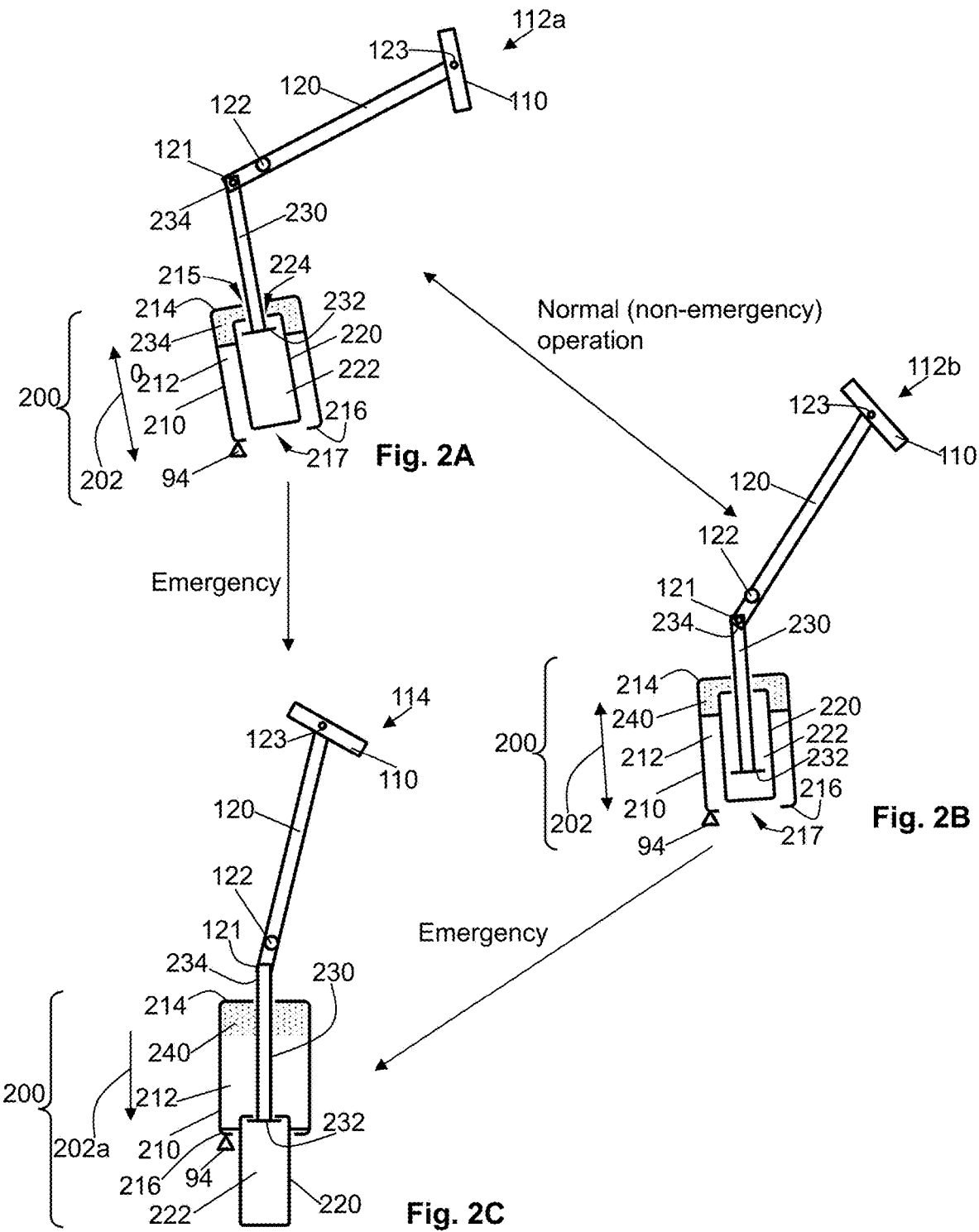

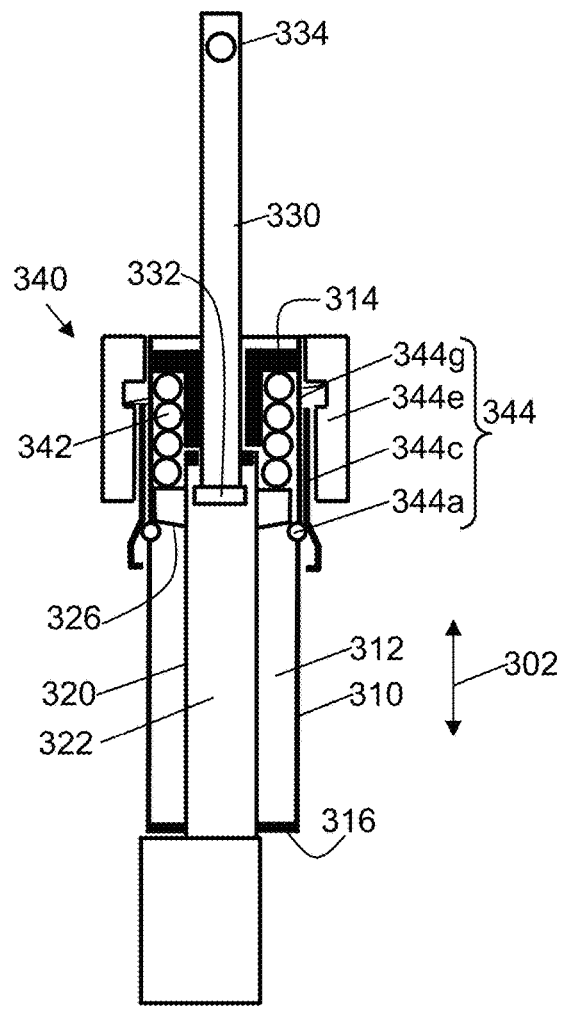
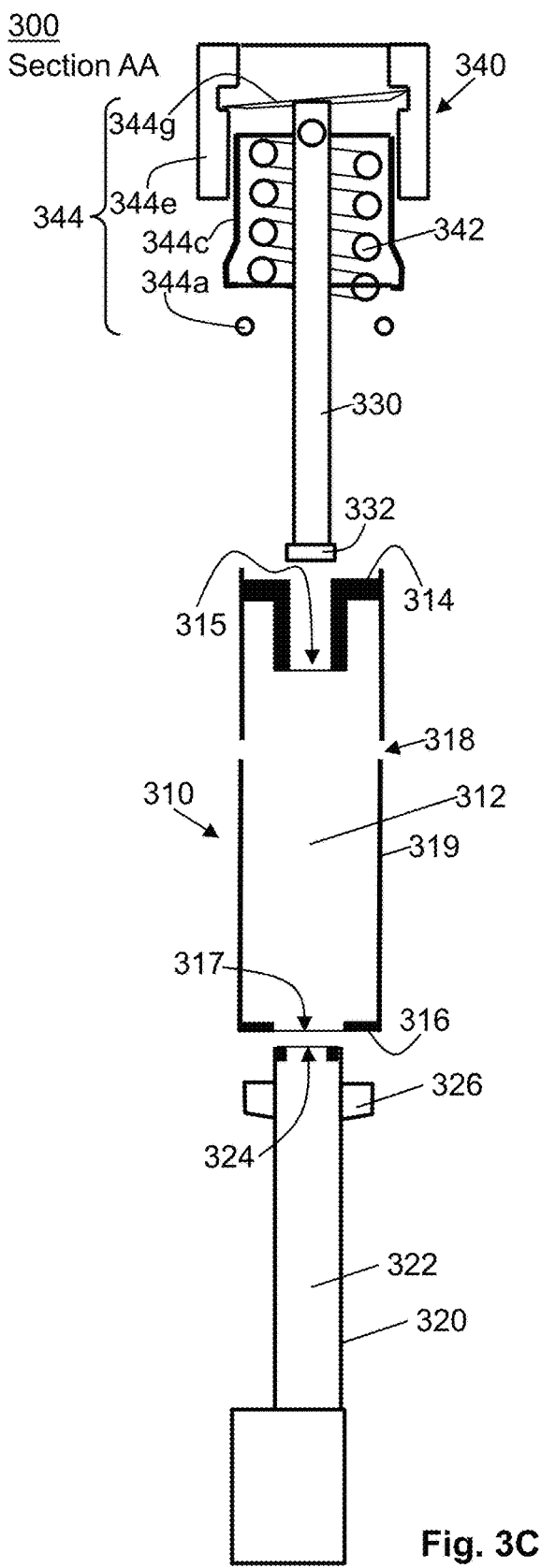
Fig. 3B
Fig. 3C

Normal non-emergency operation

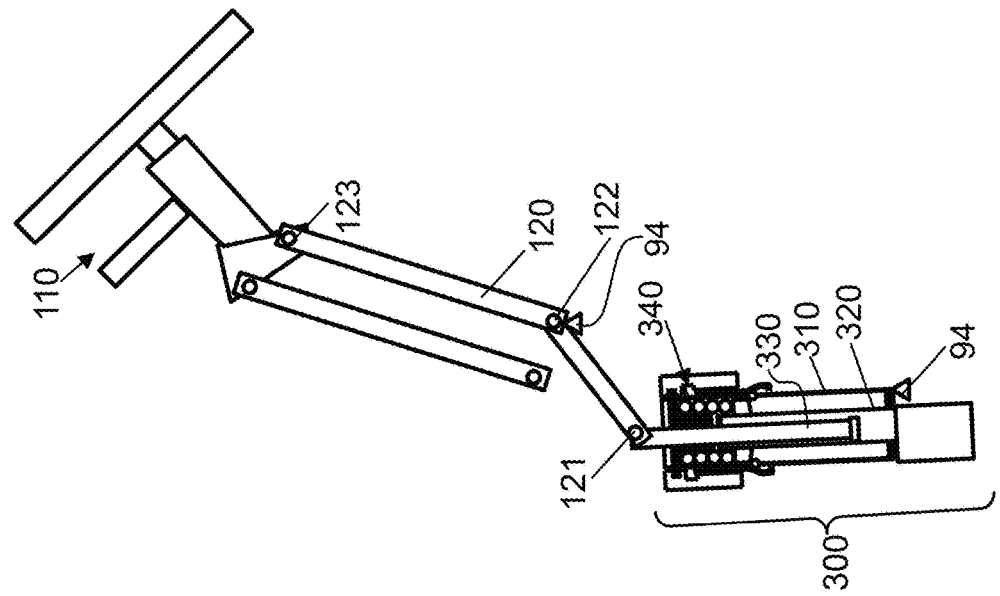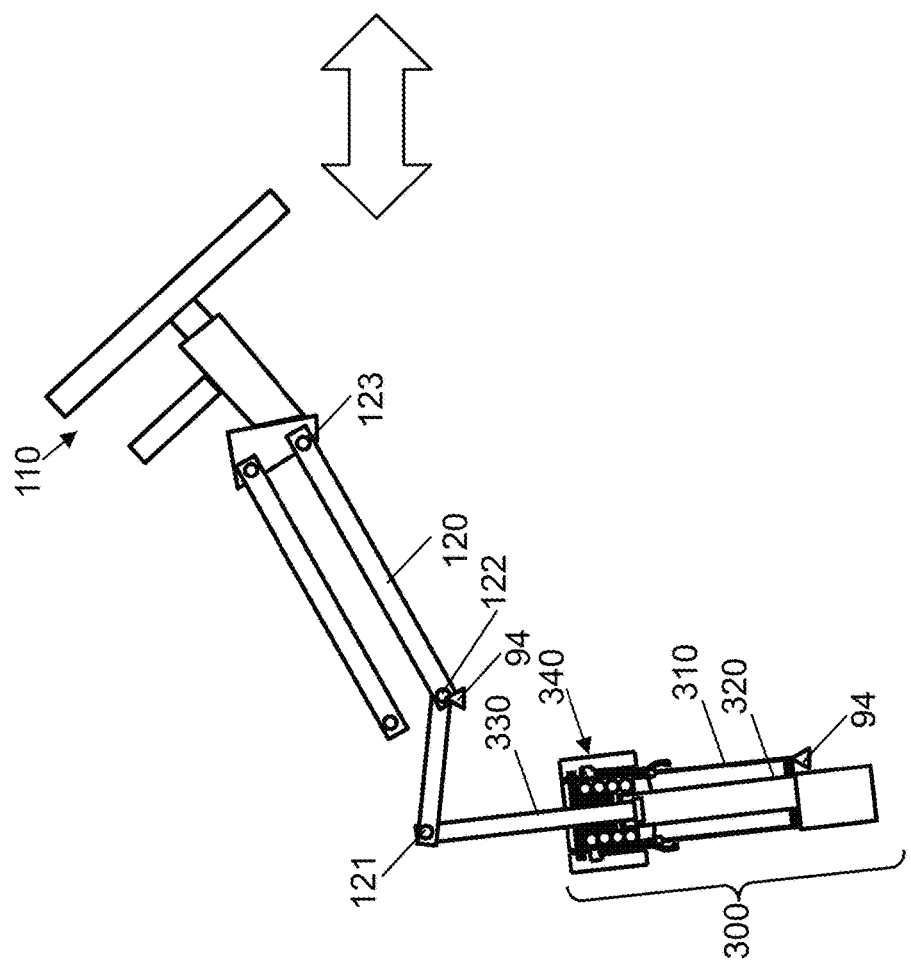
Fig. 3E

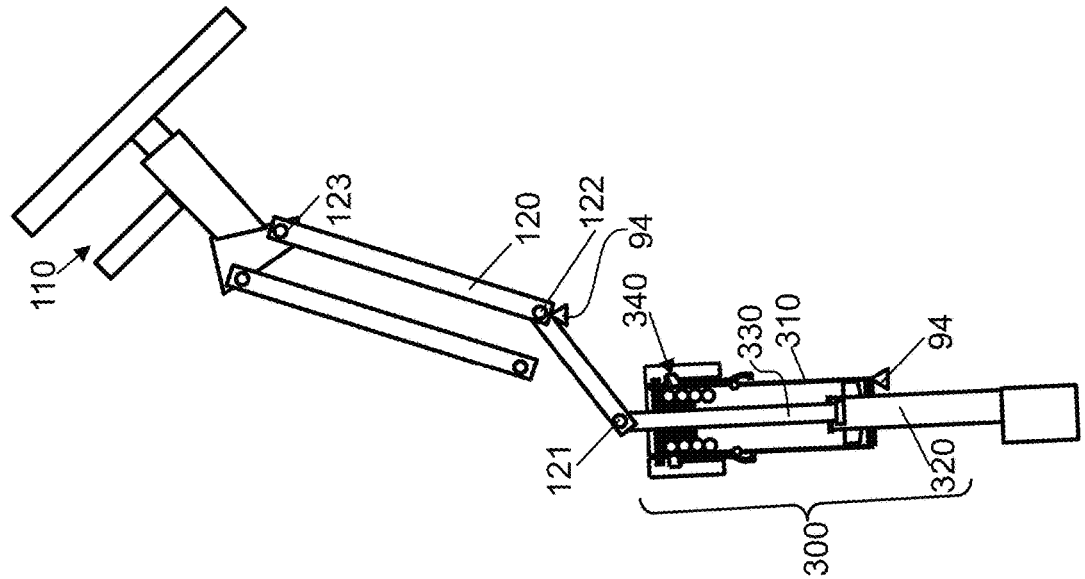

DEVICE AND SYSTEM FOR RETRACTING A CONTROL CONSOLE OF A VEHICLE IN AN EMERGENCY

CROSS REFERENCE TO RELATED APPLICATIONS

This application claims priority to U.S. Provisional Application No. 63/581,129 filed on Sep. 7, 2023, which is hereby incorporated by reference in its entirety.

FIELD OF THE INVENTION

The present invention relates to the field of devices and systems for retracting a control console of a vehicle, and more particularly, to devices and systems for retracting a control console of a vehicle in an emergency.

BACKGROUND OF THE INVENTION

In a vehicle collision, there is a risk that a driver may hit a control console or a steering wheel of the vehicle with a considerable force which may lead to an injury of the driver. Airbags are typically used to protect occupants of passenger vehicles. Typically, such airbags inflate quickly to provide soft cushioning and restraint during collision.

SUMMARY OF THE INVENTION

Some embodiments of the present invention may provide a retractable console system for a vehicle, which may include: a control console; a linkage coupled to the control console; an actuator coupled to the linkage, the actuator being configured to: lock the linkage and the control console coupled thereto in an operational position; and upon detection of an emergency, abruptly unlock and position the linkage and the console coupled thereto in a non-operational emergency position by releasing energy.

In some embodiments, the linkage and the control console coupled thereto are movable between a plurality of operational positions.

In some embodiments, the control console includes a steering wheel, a control panel or both.

In some embodiments, the actuator is couplable to a chassis of the vehicle.

In some embodiments, the linkage and the console coupled thereto are movable with respect to the actuator.

In some embodiments, the linkage and the console coupled are movable in a longitudinal direction with respect to a chassis of a vehicle, a transverse direction with respect to the chassis of the vehicle or both.

In some embodiments, the linkage and the control console coupled thereto are movable in a linear motion, a rotational motion or both.

In some embodiments, in the non-operational emergency condition, the control console is disposed closer to a front end of the vehicle, a side of the vehicle or both than in the operational position.

In some embodiments, the detection of the emergency is by an emergency detection system of the vehicle.

In some embodiments, the actuator includes: a housing having a hollow interior, the housing being couplable to a chassis of the vehicle; a first member disposed within the hollow interior of the housing, the first member having a hollow interior; a second member partly disposed within the hollow interior of the first member, the second member being coupled to the linkage; and a detaining mechanism to lock the first member to prevent the first member from moving with respect to the housing; wherein upon the detection of the emergency, the detaining mechanism unlocks the first member and moves the first member in a longitudinal direction with respect to the housing and to carry the second member in the longitudinal direction.

In some embodiments, the second member is movable within the hollow interior of the first member in the longitudinal direction to allow the linkage and the control console coupled thereto to move between a plurality of operational positions.

In some embodiments, the first member allows the movement of the second member within the hollow interior of the first member within a predefined movement range.

In some embodiments, carrying the second member by the first member in the longitudinal direction causes the linkage and the control console coupled thereto to move from the operation position to the non-operational emergency condition.

In some embodiments, the linkage is rotatably couplable to a fixed structure of the chassis of the vehicle along a rotation axis to allow the linkage and the control console coupled thereto to move between the operational position and the non-operational emergency position in a rotational motion about the rotation axis.

In some embodiments, the linkage is coupled to the second member along a first axis and the control console is coupled to the linkage along a second axis, and wherein the rotation axis is disposed between the first axis and the second axis.

In some embodiments, the detaining mechanism includes: a spring disposed within the housing interior; and a retaining mechanism to: lock the first member in a position so as to preload the spring; and upon the actuation, unlock the first member to cause the preloaded spring to release to push and cause the first member to move in the longitudinal direction with respect to the housing to carry the second member in the longitudinal direction.

In some embodiments, the retaining mechanism includes: a plurality of balls protruding into the hollow interior of the housing through a plurality of holes formed on a lateral surface of the housing, the balls locking the first member in the position; a sleeve surrounding a longitudinal portion of the housing and covering the holes to prevent the balls from moving externally to the hollow interior of the housing through the holes; and a solenoid surrounding a longitudinal portion of the sleeve, wherein upon the actuation, the solenoid causes the sleeve to move in the longitudinal direction with respect to the housing to uncover the holes and allow the balls to move externally to the hollow interior of the housing through the holes to unlock the first member.

In some embodiments, the actuator includes a motor.

In some embodiments, the actuator includes a chemical reactor.

Some embodiments of the present invention may provide a vehicle which may include: a chassis; an emergency control system which may include: a sensor for detecting an emergency state, and a transmitting unit to transmit a signal indicative of the emergency state; and the retractable console system described herein, wherein the actuation of the actuator of the retractable console system is caused by the signal indicative of the emergency state.

Some embodiments of the present invention may provide a device for retracting a control console of a vehicle, which may include: a housing having a hollow interior, the housing being couplable to a chassis of a vehicle; a first member disposed within the hollow interior of the housing, the first member having a hollow interior; a second member partly disposed within the hollow interior of the first member, the second member being couplable to a linkage, the linkage being coupled to the control console; and a detaining mechanism to lock the first member; wherein upon detection of an emergency, the detaining mechanism unlocks the first member and moves the first member to move in a longitudinal direction with respect to the housing and to carry the second member in the longitudinal direction.

In some embodiments, the second member is movable within the hollow interior of the first member in the longitudinal direction to allow the control console to be moved between a plurality of operational positions.

In some embodiments, the first member allows a movement of the second member within the hollow interior of the first member within a predefined movement range.

In some embodiments, carrying the second member by the first member in the longitudinal direction causes the control console to move from an operational position to a non-operational emergency position.

In some embodiments, the linkage is rotatably couplable to a fixed structure of a chassis of the vehicle along a rotation axis to allow the linkage and the control console coupled thereto to move between a plurality of operational positions and from an operational position of the plurality of operational positions to a non-operational emergency position in a rotational motion about the rotation axis.

In some embodiments, the linkage is coupled to the second member along a first axis and the control console is coupled to the linkage along a second axis, and wherein the rotation axis is disposed between the first axis and the second axis.

In some embodiments, the detaining mechanism includes: a spring disposed within the housing interior; and a retaining mechanism to: lock the first member in a position so as to preload the spring; and upon the detection of the emergency, unlock the first member to cause the preloaded spring to detaining to push and cause the first member to move in the longitudinal direction with respect to the housing to carry the second member in the longitudinal direction.

In some embodiments, the retaining mechanism includes: a plurality of balls protruding into the hollow interior of the housing through a plurality of holes formed on a lateral surface of the housing, the balls holding the first member in the position; a sleeve surrounding a longitudinal portion of the housing and covering the holes to prevent the balls from moving externally to the hollow interior of the housing through the holes; and a solenoid surrounding a longitudinal portion of the sleeve, wherein upon actuation, the solenoid causes the sleeve to move in the longitudinal direction with respect to the housing to uncover the holes and allow the balls to move externally to the hollow interior of the housing through the holes to release the first member.

In some embodiments, the detaining mechanism includes a motor.

In some embodiments, the detaining mechanism includes a chemical reactor.

In some embodiments, the detaining mechanism is actuated by a signal received from a sensor, the signal being indicative of an emergency state.

Some embodiments of the present invention may provide a vehicle which may include the device described herein.

BRIEF DESCRIPTION OF THE DRAWINGS

For a better understanding of embodiments of the invention and to show how the same can be carried into effect, reference is made, purely by way of example, to the accompanying drawings in which like numerals designate corresponding elements or sections throughout. In the accompanying drawings:

FIGS. 2A, 2B and 2C are schematic illustrations of a device for retracting a linkage and a control console of the retractable console system, according to some embodiments of the invention;

FIG. 3B is a schematic illustration of a partial sectional view of the device along line AA of FIG. 3A, according to some embodiments of the invention;

FIG. 3C is a schematic illustration of an exploded partial sectional view of the device, according to some embodiments of the invention;

FIG. 3E shows schematic illustrations of normal non-emergency operation of the device, the linkage and the control console, according to some embodiments of the invention;

FIG. 3G shows schematic illustrations of an operation of the device, the linkage and the control console in emergency, according to some embodiments of the invention.

Figure 1A:
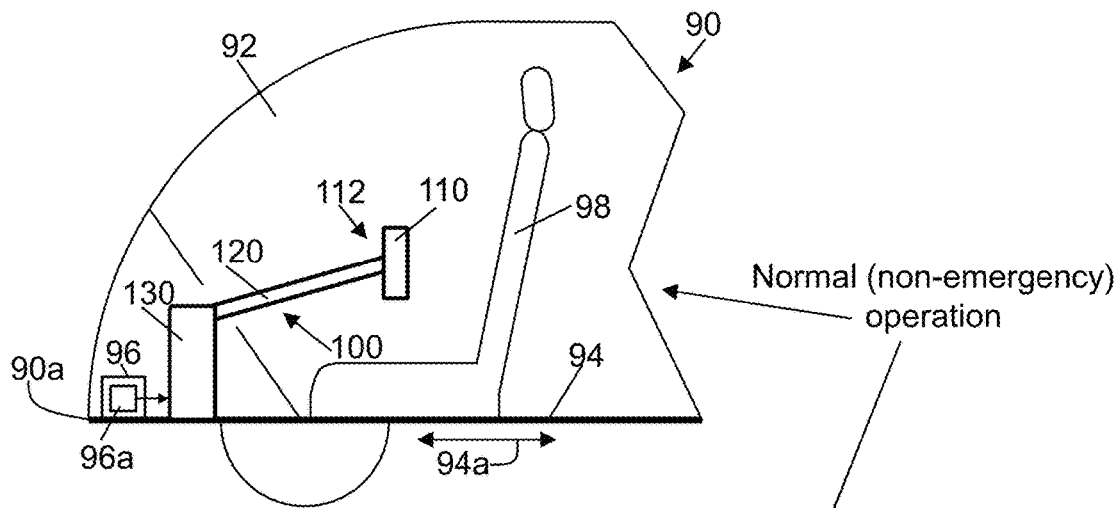
FIGS. 1A, 1B and 1C are schematic illustrations of a front portion of a vehicle and a retractable console system disposed in the vehicle, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Embodiments of the present invention may improve the safety of a vehicle by retracting a control console of the vehicle away from a driver upon detection of an emergency.

Embodiments of the present invention may provide a retractable console system for a vehicle, which may include a control console, a linkage coupled to the control console and an actuator coupled to the linkage. In a normal non-emergency operation, the actuator may lock the linkage and the control console coupled thereto in an operation position and/or allow the linkage and the control console coupled thereto to move between a plurality of operational positions. Upon detection of an emergency, the actuator may abruptly unlock and position the linkage and the control console coupled thereto in a non-operational emergency position, for example by releasing energy (e.g., potential energy) stored within or coupled to the actuator.

Figure 1B:
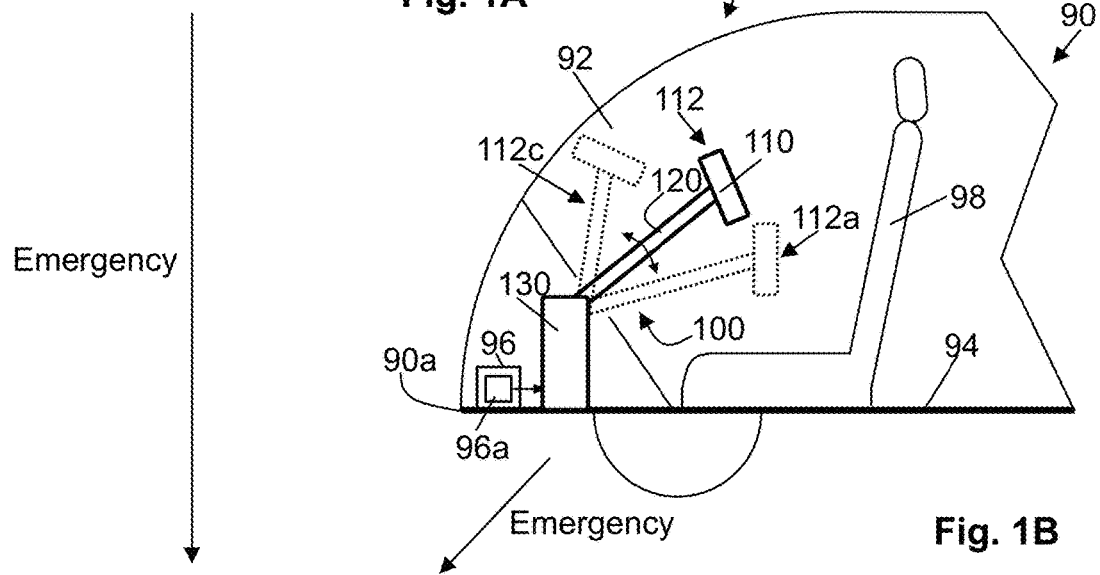
Figure 1C:
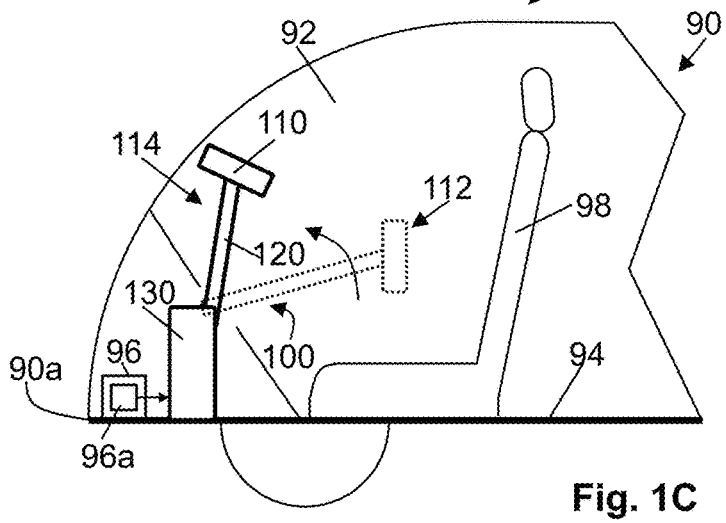

Reference is made to FIGS. 1A, 1B and 1C, which are schematic illustrations of a front portion of a vehicle 90 and a retractable console system 100 disposed in vehicle 90, according to some embodiments of the invention.

System 100 may include a control console 110. Control console 110 may include a driver (e.g., steering) wheel, a control panel (e.g., one or more of instruments panel, screen, touch panel, touch screen) or both. Control console 110 may be disposed in a cabin 92 of vehicle 90. System 100 may include a linkage 120. Linkage 120 may be coupled to control console 110. System 100 may include an actuator 130. Actuator 130 may be coupled to linkage 120. Actuator 130 may be coupled to a chassis 94 of vehicle 90.

In a normal non-emergency operation, actuator 130 may lock linkage 120 and control console 110 coupled thereto in an operational position 112 (e.g., as shown in FIG. 1A). In some embodiments, linkage 120 and control console 110 coupled thereto are movable between a plurality of operational positions 112. In some embodiments, actuator 130 allows linkage 120 and control console coupled thereto to move between a plurality of operational positions 112. For example, linkage 120 and control console 110 coupled thereto may move between an extracted (e.g., fully extracted) operational position 112a and a retracted (e.g., fully retracted) operational position 112c (e.g., as shown in FIG. 1B). Linkage 120 and control console 110 coupled thereto may move with respect to chassis 94 of vehicle 90 in a longitudinal direction 94a, a transverse direction (e.g., perpendicular to longitudinal direction 94a) or both. Linkage 120 and control console 110 coupled thereto may move with respect to chassis 94 of vehicle 90 in a rotational motion (e.g., as shown in FIGS. 1B and 1C), a linear motion or both.

Upon detection of an emergency, actuator 130 may abruptly unlock and cause linkage 120 and control console 110 coupled thereto to rapidly move from operational position 112 to a non-operational emergency position 114 (e.g., as shown in FIG. 1C), for example by releasing energy (e.g., energy stored within or actuator 130 or associate with actuator 130). For example, actuator 130 may cause linkage 120 and control console 110 coupled thereto to move from operational position 112 to a non-operational emergency position 114 in a time interval ranging between 0.05 to 0.2 seconds, which is the period of time that allows safe movement of control console 110 away from the driver before the driver collides with control console 110. Non-operational emergency position 114 may be the same as fully retracted operational position 112c or any other suitable position in which control console 110 is taken away from a driver seat 98 of vehicle 90, for example towards a front end 90a of vehicle 90. The energy stored within or coupled to actuator 130 may be sufficient to provide a force that can move linkage 120 and console 110 coupled thereto to non-operational position 114. The energy may be stored within or coupled to actuator 130 in a form of compressed or expandable component. The energy may be stored within or coupled to actuator 130 in a form of compressed or expandable elastic material.

The emergency may be detected by, for example, an emergency detection system 96 of vehicle 90. Emergency detection system 96 may include a sensor 96a (e.g., collision sensor) that may detect that vehicle 90 is subject to a force caused by the emergency (e.g., collision). Upon detection of the emergency, sensor 96a may transmit a signal to actuator 130. Upon receipt of the signal from sensor 96a of emergency detection system 96, actuator 130 may abruptly unlock and force (e.g., cause) linkage 120 and control console 110 coupled thereto to move rapidly from operational position 112 to non-operational emergency position 114, for example by releasing energy.

In another example, actuator 130 may be mechanically coupled to a front bumper of vehicle 90. In the emergency, for example if the front bumper is damaged, the mechanical coupling may cause actuator 130 to abruptly unlock and force (e.g., cause) linkage 120 and control console 110 coupled thereto to move rapidly from operational position 112 to non-operational emergency position 114, for example by releasing energy.

Allowing linkage 120 and control console 110 coupled thereto to move between a plurality of operational positions 112 in a normal non-emergency operation may allow the driver to get in and out of cabin 92 of vehicle 90 in a convenient way and/or allow the driver to adjust the position of control console 110 between plurality of operational positions 112. In some embodiments, linkage 120 and control console 110 coupled thereto are moved manually, for example by the driver. In various embodiments, actuator 130 and/or any other suitable actuator of system 100 may include an adjustment actuator (e.g., electrical, pneumatic, hydraulic, etc.) that can assist in moving linkage 120 and control console 110 coupled thereto between plurality of operational positions 112 in a controlled manner. For example, actuator 130 and/or any other suitable actuator of system 100 may move linkage 120 and control console 110 coupled thereto between retracted operational position 112c and extracted operational position 112a and/or any selected operational position 112 upon receipt of a signal from a seatbelt indicator and/or upon receipt of a signal from control console 110.

Reference is made to FIGS. 2A, 2B and 2C, which are schematic illustrations of a device 200 for retracting linkage 120 and control console 110 of retractable console system 100, according to some embodiments of the invention. Device 200 may be used in retractable console system 100 as actuator 130.

Device 200 may include a housing 210. Housing 210 may be coupled (e.g., rotatably coupled) to chassis 94 of vehicle 90. Housing 210 may include a hollow interior 212.

Device 200 may include a first member 220. First member 220 may be disposed within hollow interior 212 of housing 210. First member 220 may include a hollow interior 222.

Device 200 may include a second member 230. Second member 230 may have a first end 232 and a second end 234. Second member 230 may be partly disposed within hollow interior 222 of first member 220. First end 232 of second member 230 may be disposed within hollow interior 222 of first member 220. Second end 234 of second member 230 may extend externally to hollow interior 212 of housing 210 through an opening 215 on a first end 214 of housing 210. Second member 230 may be coupled (e.g., rotatably coupled) to linkage 120 (e.g., at second end 234 or any other suitable position along second member 230). First member 220 may be a hollow rod. First member 220 may be a second housing that may allow second member 230 to move therein. Second member 230 may be for example a rod, a bar, or a linkage member.

Device 200 may include a detaining mechanism 240. In normal non-emergency operation, detaining mechanism 240 may lock first member 220 in hollow interior 212 of housing 210 to prevent first member 220 from moving with respect to housing 210. In normal non-emergency operation, second member 230 may move within hollow interior 222 of first member 220 in a longitudinal direction 202 (e.g., extending between first end 214 and second end 216 of housing 210). First member 220 may prevent first end 232 of second member 230 from escaping from within hollow interior 222 of first member 220, thus defining a movement range within which second member 230 may move within hollow interior 222 of first member 220. For example, first end 232 of second member 230 may have greater dimensions than an opening 224 through which second member 230 extends externally to hollow interior 222 of first member 220.

Movement of second member 230 within hollow interior 222 of first member 220 may allow linkage 120 and control console 110 coupled thereto to move between plurality of operational positions 112 (e.g., between fully extracted and fully retracted operation positions 112a, 112b as shown in FIGS. 2A and 2B, respectively) in normal non-emergency operation of device 200. Linkage 120 may be rotatably coupled to chassis 94 of vehicle 90 (e.g., via a fixed structure of chassis 94) along a rotation axis 122. Rotation axis 122 may be disposed along linkage 120 between a point or axis 121 at which linkage 120 is coupled to second member 230 and a point or axis 123 at which linkage 120 is coupled to control console 110. Rotation of linkage 120 about rotation axis 122 may allow linkage 120 and control console coupled thereto to move between operational positions 112 in a rotational motion (e.g., as schematically shown in FIGS. 2A and 2B).

Allowing linkage 120 and control console 110 coupled thereto to move between plurality of operational positions 112 (e.g., by allowing second member 230 to move within hollow interior 222 of first member 220) may allow the driver to get in and out of cabin 92 of vehicle 90 in a convenient way and/or allow the driver to adjust the position of control console 110 in the plurality of operational positions 112. In some embodiments, linkage 120 and control console 110 coupled thereto are moved manually, for example by the driver. In some embodiments, device 200 includes an adjustment actuator (e.g., electric motor and/or any other suitable component) that may move second member 230 with respect to first member 220 in a controlled manner (e.g., upon receipt of a signal from a seatbelt indicator and/or upon receipt of a signal from control console 110).

Upon detection of the emergency (e.g., as described hereinabove), detaining mechanism 240 may abruptly unlock first member 220 and cause first member 220 to move rapidly in a longitudinal direction 202a towards a second end 216 of housing 210 (e.g., by releasing energy) and carry (e.g., pull or push) second member 230 in longitudinal direction 202a. For example, first member 220 may move externally to hollow interior 212 of housing 210 through an opening 217 on second end 216 of housing 210. Carrying (e.g., pulling or pushing) second member 230 by first member 210 in longitudinal direction 202 may cause linkage 120 and control console 110 coupled thereto to move from operational position 112 to non-operational emergency position 114 (e.g., as shown in FIG. 2C).

In some embodiments, detaining mechanism 240 includes a preloaded spring (e.g., as described hereinbelow). Upon detection of the emergency, detaining mechanism 240 may abruptly cause first member 220 to move with respect to housing 210 and pull second member 230 in longitudinal direction 202 by releasing energy stored in the preloaded spring.

In some embodiments, detaining mechanism 240 includes a chemical reactor. Upon detection of the emergency, detaining mechanism 240 may initiate a chemical reaction to abruptly cause first member 220 to move with respect to housing 210 and pull second member 230 in longitudinal direction 202 by releasing chemical energy.

In various embodiments, detaining mechanism 240 includes a motor, a pneumatic actuator, a hydraulic actuator and/or any other suitable actuator that can abruptly cause first member 220 to move with respect to housing 210 and pull second member 230 in longitudinal direction 202 by releasing energy and/or by converting energy to a mechanical force.

Figure 3A:
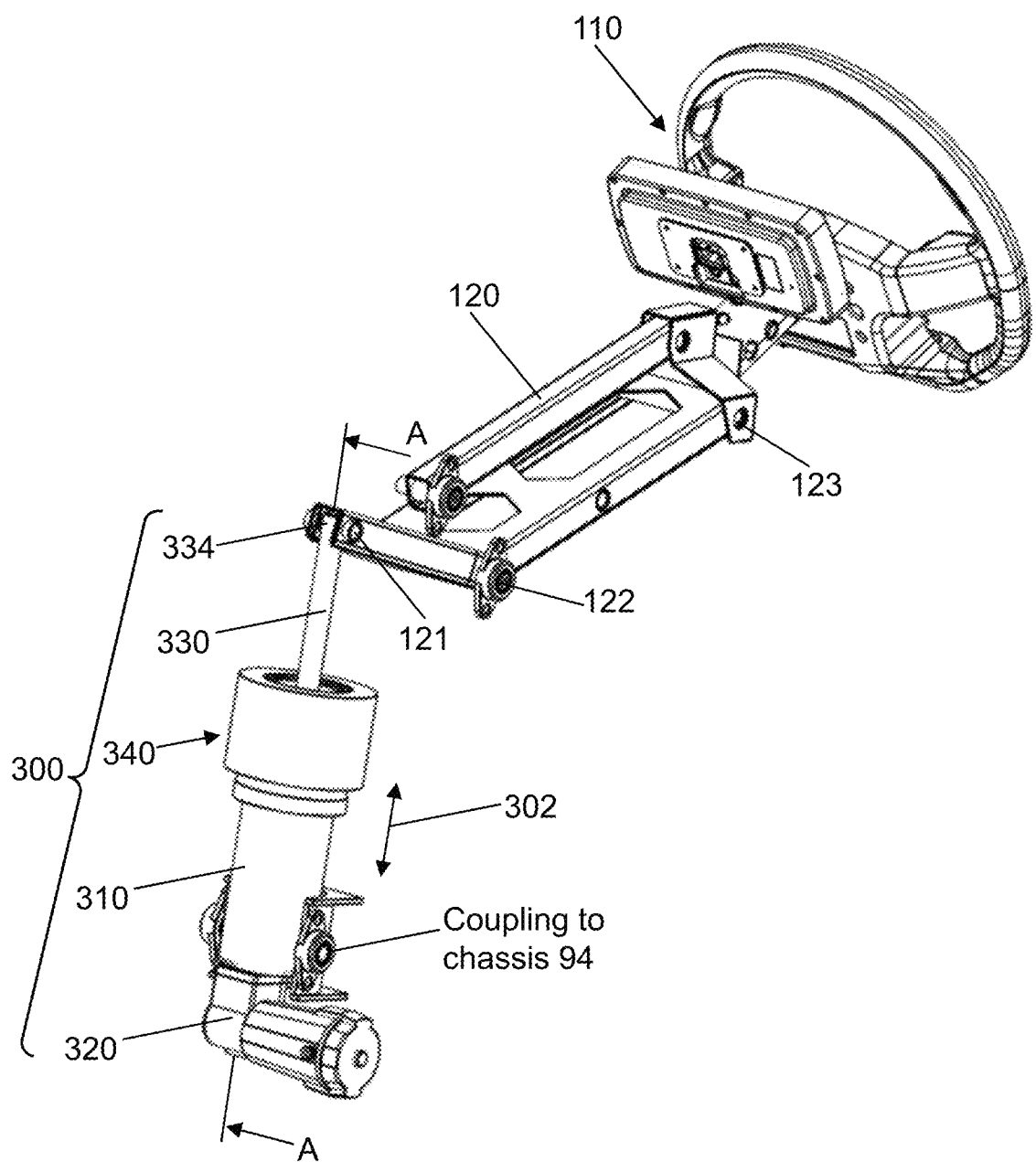
FIG. 3A is a 3D diagram of a device for retracting the linkage and the control console of the retractable console system, according to some embodiments of the invention.

Reference is made to FIG. 3A, which is a 3D diagram of a device 300 for retracting linkage 120 and control console 110 of retractable console system 100, according to some embodiments of the invention.

Reference is also made to FIG. 3B, which is a schematic illustration of a partial sectional view of device 300 along line AA of FIG. 3A, according to some embodiments of the invention.

Reference is also made to FIG. 3C, which is a schematic illustration of an exploded partial sectional view of device 300, according to some embodiments of the invention. FIG. 3B shows a partial sectional view of device 300 along line AA.

Figure 3D:
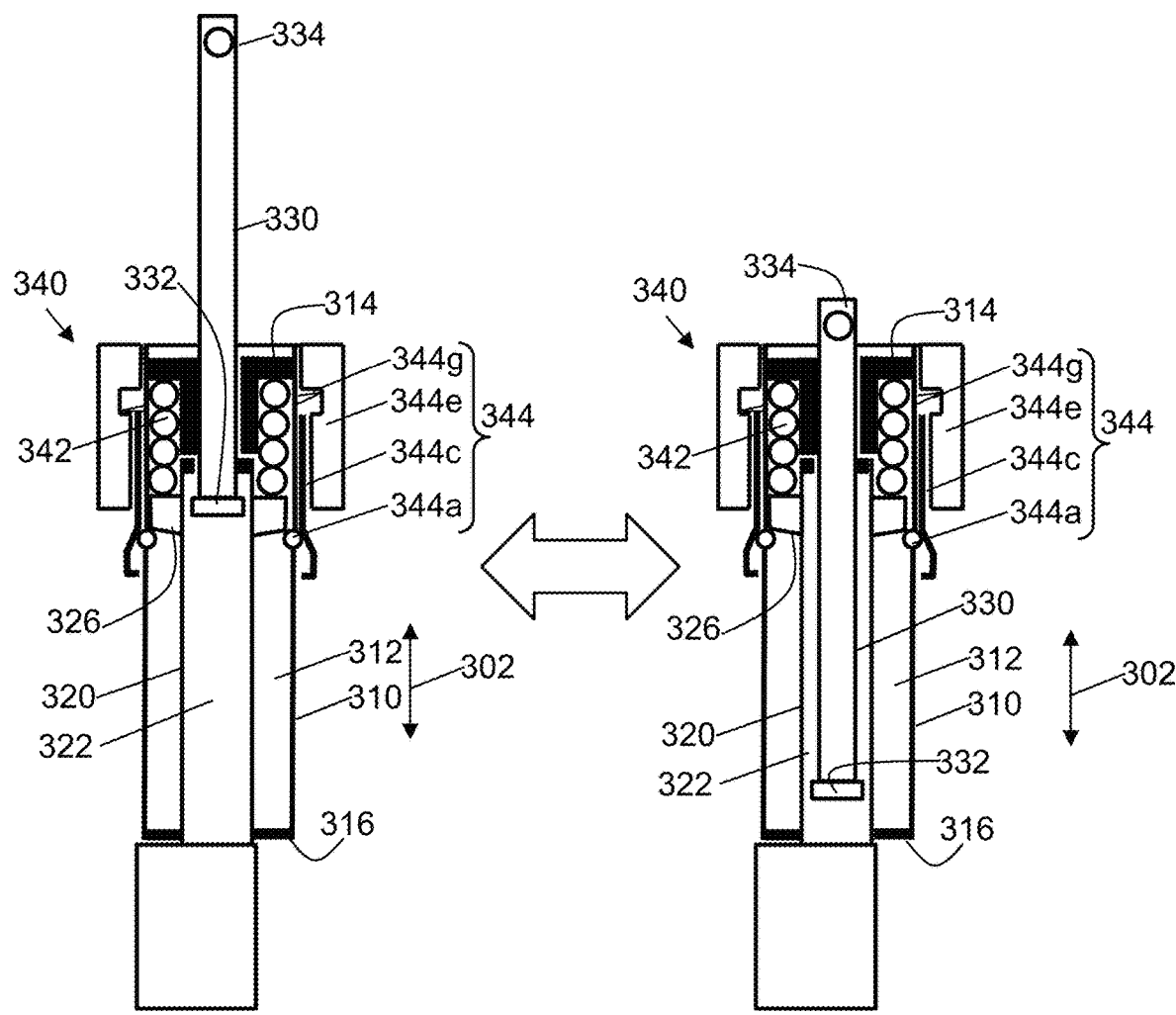
FIG. 3D shows schematic illustrations of a normal non-emergency operation of the device, according to some embodiments of the invention.

Reference is also made to FIG. 3D, which shows schematic illustrations of a normal non-emergency operation of device 300, according to some embodiments of the invention. FIG. 3D shows partial sectional views of device 300 along line AA.

Reference is also made to FIG. 3E, which shows schematic illustrations of normal non-emergency operation of device 300, linkage 120 and control console 110, according to some embodiments of the invention. FIG. 3E shows partial sectional views of device 300 along line AA.

Figure 3F:
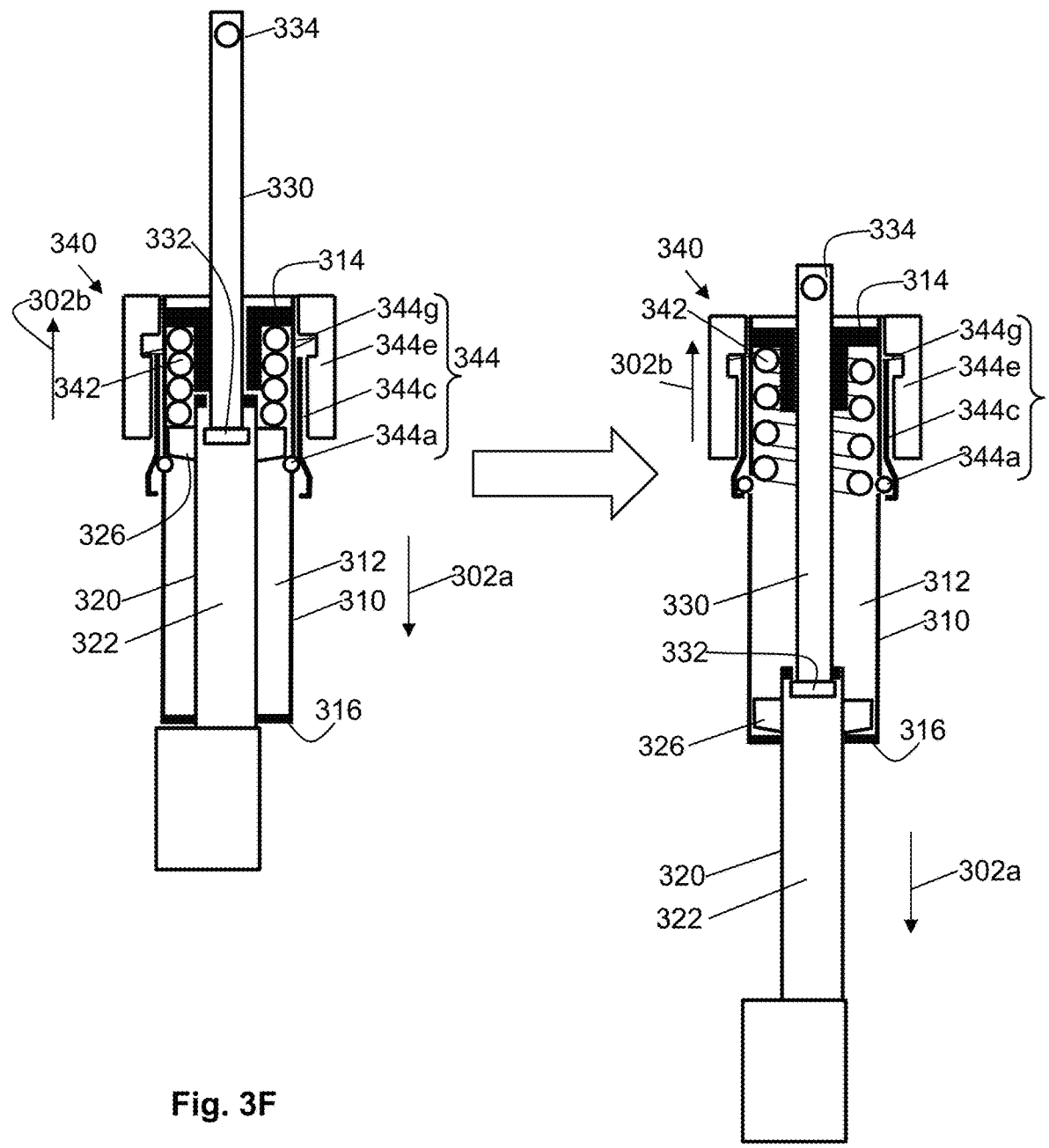
FIG. 3F shows schematic illustrations of an operation of the device in emergency, according to some embodiments of the invention.

Reference is also made to FIG. 3F, which shows schematic illustrations of an operation of device 300 in emergency, according to some embodiments of the invention. FIG. 3E shows partial sectional views of device 300 along line AA.

Reference is also made to FIG. 3G, which shows schematic illustrations of an operation of device 300, linkage 120 and control console 110 in emergency, according to some embodiments of the invention. FIG. 3G shows partial sectional views of device 300 along line AA.

Device 300 may be used in retractable console system 100 as actuator 130. Device 300 may include a housing 310. Housing 310 may be coupled (e.g., rotatably coupled) to chassis 94 of vehicle 90. Housing 310 may include a hollow interior 312.

Device 300 may include a first member 320. First member 320 may be disposed within hollow interior 312 of housing 310. First member 320 may include a hollow interior 322. First member 320 may be a hollow rod.

Device 300 may include a second member 330. Second member 330 may be a rod. Second member 330 may have a first end 332 and a second end 334. Second member 330 may be partly disposed within hollow interior 322 of first member 320. First end 332 of second member 330 may be disposed within hollow interior 322 of first member 320. Second end 334 of second member 330 may extend externally to hollow interior 312 of housing 310 through an opening 315 on a first end 314 of housing 310. Second member 330 may be coupled (e.g., rotatably coupled) to linkage 120 (e.g., at second end 334 or any other suitable position along second member 330).

Device 300 may include a detaining mechanism 340. In normal non-emergency operation, detaining mechanism 340 may lock first member 320 in hollow interior 312 of housing 210 to prevent first member 320 from moving with respect to housing 310. In normal non-emergency operation, second member 330 may move within hollow interior 322 of first member 320 in a longitudinal direction 302 (e.g., extending between first end 314 and second end 316 of housing 310). First member 320 may prevent first end 332 of second member 330 from escaping from within hollow interior 322 of first member 320, thus defining a movement range within which second member 330 may move within hollow interior 322 of first member 320. For example, first end 332 of second member 330 may have greater dimensions than an opening 324 through which second member 330 extends externally to hollow interior 322 of first member 320. Movement of second member 230 within hollow interior 222 of first member 220 may allow linkage 120 and control console 110 coupled thereto to move between plurality of operational positions 112 in normal non-emergency operation of device 300 (e.g., between fully extracted and fully retracted operation positions 112a, 112c as described herein).

Detaining mechanism 340 may include a spring 342. Spring 342 may be disposed within hollow interior 312 of housing 310. Spring 342 may be disposed between first end 314 of housing 310 and lateral projections 326 projecting externally from first member 320.

Detaining mechanism 340 may include a retaining mechanism 344. In normal non-emergency operation, retaining mechanism 344 may lock first member 320 in the position (e.g., prevent first member 320 from moving with respect to housing 310) so as to preload spring 342. Retaining mechanism 344 may include a plurality of balls 344a. Balls 344a may protrude (e.g., partly protrude) into hollow interior 312 of housing 310 through a plurality of holes 318 formed through a lateral (e.g., side) surface 319 of housing 310. When protruding into hollow interior 312 of housing 310, balls 344a may hold lateral projections 326 of first member 320 to prevent first member 320 from being moved by pre-loaded spring 342 in a longitudinal direction 302a towards a second end 316 of housing 310 so as to lock first member 320 in the position. Retaining mechanism 344 may include a sleeve 344c. Sleeve 344c may surround a longitudinal portion of housing 310. In normal non-emergency operation, sleeve 344c may cover holes 318 of housing 310 to prevent balls 344a from moving externally to hollow interior 312 of housing 312 through holes 318. Retaining mechanism 344 may include a solenoid 344c. Solenoid 344c may surround a longitudinal portion of sleeve 344c. In some embodiments, retaining mechanism 344 includes a retaining ring 344g. Retaining ring 344g may push sleeve 344c in longitudinal direction 302a towards second end 316 of housing 310 to prevent sleeve 344c from unintentionally uncovering holes 318 and prevent balls 344a from unintentionally escaping from within hollow interior 312 of housing 310 through holes 318 in normal non-emergency operation of device 300.

As shown in FIGS. 3A, 3E and 3G, linkage 120 may be rotatably coupled to chassis 94 of vehicle 90 (e.g., via a fixed structure of chassis 94) along a rotation axis 122. Rotation axis 122 may be disposed along linkage 120 between a point or axis 121 at which linkage 120 is coupled to second member 230 and a point or axis 123 at which linkage 120 is coupled to control console 110. Rotation of linkage 120 about rotation axis 122 may allow linkage 120 and control console coupled thereto to move between operational positions 112 in a rotational motion. Allowing linkage 120 and control console 110 coupled thereto to move between plurality of operational positions 112 (e.g., by allowing second member 330 to move within hollow interior 322 of first member 320 in normal non-emergency operation of device 300) may allow the driver to get in and out of cabin 92 of vehicle 90 in a convenient way and/or allow the driver to adjust the position of control console 110 in the plurality of operational positions 112. In some embodiments, linkage 120 and control console 110 coupled thereto are moved manually, for example by the driver. In some embodiments, device 200 includes an actuator that may move second member 230 with respect to first member 220 in a controlled manner (e.g., upon receipt of a signal from a seatbelt indicator and/or upon receipt of a signal from control console 110).

Upon detection of the emergency (e.g., as described hereinabove), solenoid 344e may generate a magnetic field that may cause sleeve 344c to move in a longitudinal direction 302b towards first end 314 of housing 310 to uncover holes 318. Balls 344a that are not held in holes 318 by sleeve 344c cannot hold first member 220 against the force applied by preloaded spring 342 on first member 320. Balls 344a may move externally to hollow interior 312 of housing 310 through uncovers holes 318. Preloaded spring 344a may release, push and cause first member 320 to rapidly move in longitudinal direction 302a towards second end 316 of housing 310. For example, first member 320 may escape externally to hollow interior 312 of housing 310 through an opening 317 on second end 316 of housing 310. First member 320 may carry (e.g., pull or push) second member 330 in longitudinal direction 302a towards second end 316 of housing 310. Carrying (e.g., pulling or pushing) second member 330 by first member 320 in longitudinal direction 302a may cause linkage 120 and control console 110 coupled thereto to move from operational position 112 to non-operational emergency position 114 (e.g., as described herein). Linkage 120 and control console 110 coupled thereto carried by second member 330 and first member 320 may be moved from operational position 112 to non-operational emergency position 114 within a period of time that ranges between 0.05 and 0.2 seconds, which is the period of time that allows safe movement of control console 110 away from the driver before the driver collides with control console 110.

While in FIGS. 1A-1C, 2A-2C, 3A, 3E and 3G, linkage 120 and control console 110 coupled thereto move in a rotational motion between plurality of operational positions 112 and from operational position(s) 112 to non-operational emergency position 114, linkage 120 and control console 110 coupled thereto may be configured to move in a linear motion or a combination of linear motion and rotational motion.

While in FIGS. 1A-1C, 2A-2C, 3A, 3E and 3G, linkage 120 and control console 110 coupled thereto move generally in longitudinal direction 94a of vehicle 90, linkage 120 and control console 110 may be configured to move in a transverse direction (perpendicular to longitudinal direction 94a) or a combination of longitudinal direction 94a and the transverse direction. For example, in FIGS. 1C, 2C and 3G, when in non-operational emergency position 114, linkage 120 and control console 110 coupled thereto are disposed closer to front end 90a of vehicle 90 than in operational position(s) 112. In another example, linkage 120 and control console 110 coupled thereto may be configured to be dispose closer to a side of vehicle 90 when in non-operational emergency position 114 than in operational position(s) 112.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A retractable console system for a vehicle, the system comprising:
    a control console;
    a linkage coupled to the control console;
    an actuator coupled to the linkage, the actuator being configured to:
    lock the linkage and the control console coupled thereto in an operational position of the plurality of operational positions; and
    upon detection of an emergency, abruptly unlock and position the linkage and the control console coupled thereto in a non-operational emergency position by releasing energy;
    wherein the linkage is rotatably couplable to a fixed structure of a chassis of the vehicle along a rotation axis to allow the linkage and the control console coupled thereto to move between the plurality of operational positions and from the operational position to the non-operational emergency position in a rotational motion about the rotation axis.

2. The system of claim 1, wherein the linkage and the control console coupled thereto are movable between a plurality of operational positions.

3. The system of claim 1, wherein the control console comprises at least one of a steering wheel and a control panel.

4. The system of claim 1, wherein the actuator is couplable to a chassis of the vehicle.

5. The system of claim 1, wherein the linkage and the control console coupled thereto are movable with respect to the actuator.

6. The system of claim 1, wherein the linkage and the control console coupled are movable in at least one of a longitudinal direction with respect to a chassis of a vehicle and a transverse direction with respect to the chassis of the vehicle.

7. The system of claim 1, wherein the linkage and the control console coupled thereto are movable in at least one of a linear motion and a rotational motion.

8. The system of claim 1, wherein in the non-operational emergency condition, the control console is disposed closer to at least one of a front end of the vehicle and a side of the vehicle or both than in the operational position.

9. The system of claim 1, wherein the detection of the emergency is by an emergency detection system of the vehicle.

10. The system of claim 1, wherein the actuator comprises:
    a housing having a hollow interior, the housing being couplable to a chassis of the vehicle;
    a first member disposed within the hollow interior of the housing, the first member having a hollow interior;
    a second member partly disposed within the hollow interior of the first member, the second member being coupled to the linkage; and
    a detaining mechanism to lock the first member to prevent the first member from moving with respect to the housing;
    wherein upon the detection of the emergency, the detaining mechanism unlocks the first member and moves the first member in a longitudinal direction with respect to the housing and to carry the second member in the longitudinal direction.

11. The system of claim 10, wherein the second member is movable within the hollow interior of the first member in the longitudinal direction to allow the linkage and the control console coupled thereto to move between a plurality of operational positions.

12. The system of claim 10, wherein carrying the second member by the first member in the longitudinal direction causes the linkage and the control console coupled thereto to move from the operation position to the non-operational emergency condition.

13. The system of claim 10, wherein the detaining mechanism comprises:
a spring disposed within the housing interior; and
a retaining mechanism to:
lock the first member in a position so as to preload the spring; and
upon the actuation, unlock the first member to cause the preloaded spring to release to push and cause the first member to move in the longitudinal direction with respect to the housing to carry the second member in the longitudinal direction.

14. The system of claim 13, wherein the retaining mechanism comprises:
a plurality of balls protruding into the hollow interior of the housing through a plurality of holes formed on a lateral surface of the housing, the balls locking the first member in the position;
a sleeve surrounding a longitudinal portion of the housing and covering the holes to prevent the balls from moving externally to the hollow interior of the housing through the holes; and
a solenoid surrounding a longitudinal portion of the sleeve, wherein upon the actuation, the solenoid causes the sleeve to move in the longitudinal direction with respect to the housing to uncover the holes and allow the balls to move externally to the hollow interior of the housing through the holes to unlock the first member.

15. The device of claim 1, wherein the actuator comprises a chemical reactor.

16. A vehicle comprising:
a chassis;
an emergency control system comprising:
a sensor for detecting an emergency state, and
a transmitting unit to transmit a signal indicative of the emergency state; and
the retractable console system according to claim 1, wherein the actuation of the actuator of the retractable console system is caused by the signal indicative of the emergency state.

17. A device for retracting a control console of a vehicle, the device comprising:
a housing having a hollow interior, the housing being couplable to a chassis of a vehicle;
a first member disposed within the hollow interior of the housing, the first member having a hollow interior;
a second member partly disposed within the hollow interior of the first member, the second member being couplable to a linkage, the linkage being coupled to the control console; and
a detaining mechanism to lock the first member;
wherein upon detection of an emergency, the detaining mechanism unlocks the first member and moves the first member to move in a longitudinal direction with respect to the housing and to carry the second member in the longitudinal direction;
wherein the linkage is rotatably couplable to a fixed structure of a chassis of the vehicle along a rotation axis to allow the linkage and the control console coupled thereto to move between a plurality of operational positions and from an operational position of the plurality of operational positions to a non-operational emergency position in a rotational motion about the rotation axis.

18. The device of claim 17, wherein the first member allows a movement of the second member within the hollow interior of the first member within a predefined movement range.

19. The device of claim 17, wherein carrying the second member by the first member in the longitudinal direction causes the control console to move from an operational position to a non-operational emergency position.

* * * * *